United States Patent
Lu

(10) Patent No.: US 8,572,414 B2
(45) Date of Patent: Oct. 29, 2013

(54) POWER SUPPLY SYSTEM OF ELECTRONIC DEVICE WITH IMPROVED POWER SAVING IN S5 STATE

(75) Inventor: Yi-Chung Lu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 329 days.

(21) Appl. No.: 13/097,412

(22) Filed: Apr. 29, 2011

(65) Prior Publication Data

US 2012/0054506 A1    Mar. 1, 2012

(30) Foreign Application Priority Data

Aug. 27, 2010   (CN) .......................... 2010 1 0265251

(51) Int. Cl.
*G06F 1/00* (2006.01)
*G06F 1/32* (2006.01)

(52) U.S. Cl.
USPC ............................ 713/300; 713/320; 713/324

(58) Field of Classification Search
USPC ........................................................ 713/300
See application file for complete search history.

(56) References Cited

U.S. PATENT DOCUMENTS

| | | | | |
|---|---|---|---|---|
| 5,784,625 A * | 7/1998 | Walker | ........................ | 710/260 |
| 6,775,784 B1 * | 8/2004 | Park | ............................. | 713/320 |
| 7,779,310 B2 * | 8/2010 | Wei et al. | ........................ | 714/55 |
| 7,805,623 B2 * | 9/2010 | Jia et al. | ........................ | 713/300 |
| 8,090,968 B2 * | 1/2012 | Oh | ................................ | 713/323 |
| 8,132,032 B2 * | 3/2012 | Chen et al. | ..................... | 713/320 |
| 8,250,387 B2 * | 8/2012 | Tsukamoto et al. | ......... | 713/300 |
| 2009/0106573 A1 * | 4/2009 | Lin | ............................... | 713/324 |
| 2011/0128698 A1 * | 6/2011 | Nishioka et al. | ......... | 361/679.46 |

* cited by examiner

*Primary Examiner* — Suresh Suryawanshi
(74) *Attorney, Agent, or Firm* — Altis & Wispro Law Group, Inc.

(57) ABSTRACT

A power supply system for an electronic device includes a power supply unit adapted to convert AC power to a first DC power, a DC/DC converter connected to the power supply unit, a super I/O chipset connected to the DC/DC converter, and a south bridge chipset connected to the DC/DC converter via a switch. The DC/DC converter is adapted to convert the first DC power into a second DC power. The switch is connected to the super I/O chipset and controlled by the super I/O chipset. The super I/O chipset is adapted to turn on the switch to have the DC/DC converter supply the second DC power to the south bridge chipset when the electronic device is turned on. The super I/O chipset is also adapted to turn off the switch when the electronic device is shut down.

18 Claims, 2 Drawing Sheets

POWER SUPPLY SYSTEM OF ELECTRONIC DEVICE WITH IMPROVED POWER SAVING IN S5 STATE

BACKGROUND

1. Technical Field

The present disclosure relates to a power supply system, more particularly to a power supply system for an electronic device.

2. Description of Related Art

In a personal computer (PC) system, power management is adopted to conserve energy while the PC is in use and put the PC to sleep to save energy when the PC is not in use. System power states derive from the Advanced Configuration and Power Interface (ACPI) specification. They are defined as follows:

S0/Working—The CPU is fully up and running; devices are powered up and down as needed.

S1—The CPU is stopped; RAM is refreshed; the system is running in a low power mode.

S2—The CPU has no power; RAM is refreshed; the system is in a lower power mode than S1.

S3—The CPU has no power; RAM is in slow refresh mode; the power supply is generally in a reduced power mode (for example, it cannot supply much power and is running in a lower power efficiency mode).

S4—The hardware is completely off; system memory has been saved to disk.

S5/Off—the hardware is completely off; the operating system has shut down; nothing has been saved.

Usually, when the computer is retained in S5 state, it consumes less power than in other states. However, in conventional S5 state, some components of the computer still consume power which causes unnecessary waste.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
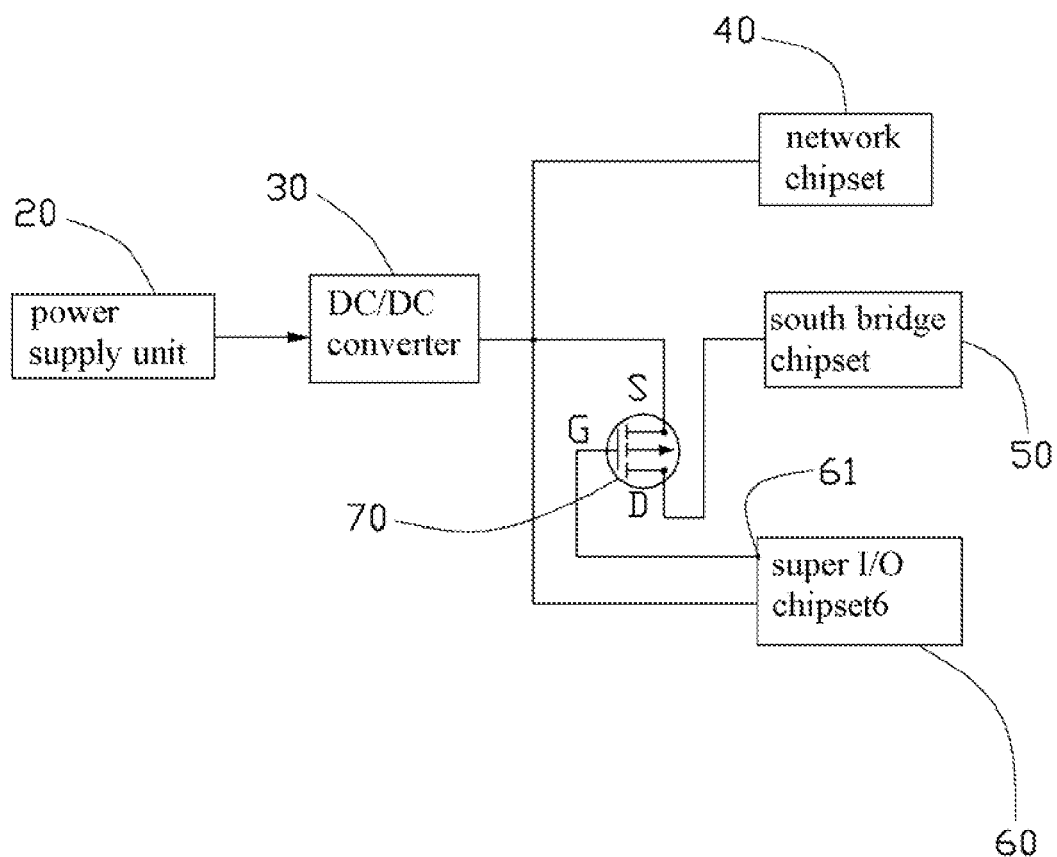
FIG. 1 is a block diagram of an embodiment of a power supply system of an electronic device.

Referring to FIG. 1, a power supply system of an electronic device in accordance with an embodiment, includes a power supply unit 20, a direct current to direct current (DC/DC) converter 30, a network chipset 40, a south bridge chipset 50, a super input output (super I/O) chipset 60.

The power supply unit 20 can receive alternating current (AC) power, and convert the AC power into a first DC power. The first DC power is supplied to the DC/DC converter 30. In one embodiment, the first DC power is a +5V standby voltage. The +5V standby voltage is provided by the power supply unit 20 even the electronic device is shut down. The DC/DC converter 30 converts the first DC power into a second DC power. In one embodiment, the second DC power is a +3.3 C voltage. The second DC power is supplied to the network chipset 40 and the super I/O chipset 60 directly and supplied to the south bridge chipset 50 via a switch 70. In one embodiment, the switch 70 is a P channel MOSFET (metal-oxide-semiconductor field-effect transistor). A grid G of switch 70 is connected to a control pin 61 of the super I/O chipset 60. A source S of the switch 70 is connected to the DC/DC converter 30 to receive the second DC power. A drain D of the switch 70 is connected to the south bridge chipset 50.

Figure 2:
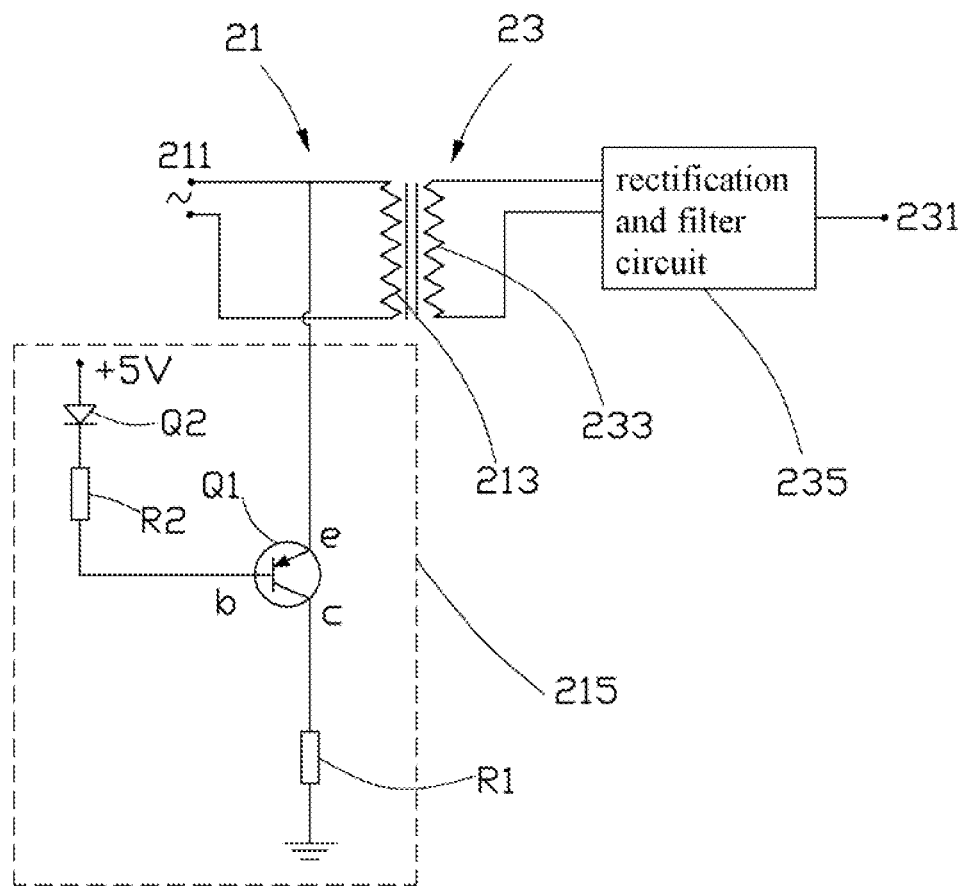
FIG. 2 is a circuit view of a power supply unit of the power supply system of FIG. 1.

Referring to FIG. 2, a circuit of the power supply unit 20 is shown. The power supply unit 20 includes a primary portion 21 and a secondary portion 23. The primary portion 21 includes an input interface 211, a primary coil 213, and a discharge circuit 215. The input interface 211 is supplied with AC power and is connected to the primary coil 213. The discharge circuit 215 is connected to the primary coil 213. The discharge circuit 215 includes a pnp type transistor Q1, a diode Q2, a first resistor R1, and a second resistor R2. An emitter e of the transistor Q1 is connected to the primary coil 213. A collector c of the transistor Q1 is connected to ground via the first resistor R1. An anode of the diode Q2 is supplied with the first DC power. A cathode of the diode Q2 is connected to a base b of the transistor Q1 via the second resistor R2.

The secondary portion 23 includes an output interface 231, a second coil 233, and a rectification and filter circuit 235. The rectification and filter circuit 235 is connected between the output interface 231 and the second coil 233. The output interface 231 outputs the first DC power.

When the input interface 211 receives AC power, the power supply unit 20 converts the AC power into the first DC power. The DC/DC converter 30 converts the first DC power into the second DC power. A voltage level at the base b of the first transistor Q1 is high. The transistor Q1 is off. The discharge circuit 215 does not discharge current. The electronic device can work in S0 to S5 states. When the electronic device works in the S0 state, the super I/O chipset 60 and the network chipset 40 are supplied with the second DC power. The control pin 61 of the super I/O chipset 60 outputs a low level control signal to turn on the switch 70 according to the S0 state. The second DC power is provided to the south bridge chipset 50. When the electronic device work is in the S5 state, the control pin 61 of the super I/O chipset 60 outputs a high level control signal to turn off the switch 70 according to the S5 state. The second DC power is not supplied to the south bridge chipset 50. The south bridge chipset 50 does not consume power.

If the electronic device needs to be returned to the S0 state from the S5 state, a remote computer can send a power on signal to the electronic device via the network chipset 40. The network chipset 40 then sends the power on signal to the super I/O chipset to power on the electronic device.

When the input interface 211 does not receive AC power, some power may still remain in the primary portion 21. Now, a voltage level on the base b of the first transistor Q1 is low. The transistor Q1 is on and discharges the power remaining in the primary portion 21. Therefore, the power supply unit 20 is protected.

In the embodiment, the discharge circuit 215 only discharges power when the input interface 211 does not receive AC power to save power.

In the embodiment, when the electronic device is in the S5 state, the network chipset 40 works in semi-duplex mode to save power.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed. It is also to be understood that the above description and the claims drawn to a method may include some indication in reference to certain steps. However, the indication used is only to be viewed for identification purposes and not as a suggestion as to an order for the steps.

What is claimed is:

1. A power supply system for an electronic device, comprising:
    a power supply unit adapted to convert an AC power into a first DC power;
    a DC/DC converter connected to the power supply unit, the DC/DC converter adapted to convert the first DC power into a second DC power;
    a super I/O chipset, the DC/DC converter connected to the super I/O chipset directly to provide the second DC power to the super I/O chipset; and
    a south bridge chipset connected to the DC/DC converter via a switch, the switch connected to the super I/O chipset and controlled by the super I/O chipset, wherein the super I/O chipset is adapted to turn on the switch to have the DC/DC converter supply the second DC power to the south bridge chipset, when the electronic device is turned on, and the super I/O chipset is adapted to turn off the switch when the electronic device is shut down;
    wherein the power supply unit comprises a discharge circuit, the discharge circuit is adapted to discharge remaining current of the power supply unit when the power supply unit does not receive the AC power.

2. The power supply system of claim 1, wherein the switch is a P channel MOSFET.

3. The power supply system of claim 2, wherein the grid of the P channel MOSFET is connected to a control pin of the super I/O chipset, a source of the P channel MOSFET is connected to the DC/DC adapted to receive the second DC power, and a drain of the P channel MOSFET is connected to the south bridge chipset; the control pin is adapted to output a low level control signal when the electronic device is turned on and is adapted to output a high level control signal when the electronic device is shut down.

4. The power supply system of claim 1, wherein the first DC power is a +5V standby voltage.

5. The power supply system of claim 1, wherein the discharge circuit includes a PNP type transistor, an emitter of the PNP type transistor is connected to a primary coil of the power supply unit, a collector of the PNP type transistor is connected to ground via a first resistor, and a base of the PNP type transistor is connected to the first DC power via a second resistor.

6. The power supply system of claim 5, wherein a diode is connected between the second resistor and the first DC power; an anode of the diode is supplied with the first DC power, and a cathode of the diode is connected to the second resistor.

7. The power supply system of claim 1, further comprising a network chipset, wherein the DC/DC converter is connected to the network chipset to supply the second DC power to the network chipset.

8. The power supply system of claim 7, wherein the network chipset is adapted to transmit a power on signal to the super I/O chipset when the electronic device is shut down.

9. The power supply system of claim 7, wherein the network chipset is adapted to work in a semi-duplex mode to save power when the electronic device is shut down.

10. A power supply system for an electronic device, comprising:
    a power supply unit adapted to convert an AC power into a first DC power;
    a DC/DC converter provided with the first DC power, the DC/DC converter is adapted to convert the first DC power to a second DC power; and
    a first chipset, the DC/DC converter connected to the first chipset directly to supply the second DC power to the first chipset, the first chipset comprising a control pin; and
    a second chipset connected to the DC/DC converter via a switch, the second chipset connected to the control pin and controlled by the control pin, wherein the control pin is adapted to turn on the switch to have the DC/DC converter supplying the second DC power to the second chipset when the electronic device is turned on, and the control pin is adapted to turn off the switch when the electronic device is shut down;
    wherein the switch is a P channel MOSFET, a grid of the P channel MOSFET is connected to the control pin of the first chipset, a source of the P channel MOSFET is connected to the DC/DC converter to receive the second DC power, and a drain of the P channel MOSFET is connected to the second chipset; the control pin is adapted to output a low level control signal when the electronic device is turned on, and is adapted to output a high level control signal when the electronic device is shut down.

11. The power supply system of claim 10, wherein the first DC power is a +5V standby voltage.

12. The power supply system of claim 11, wherein the power supply unit comprises a discharge circuit, the discharge circuit is adapted to discharge remaining current of the power supply unit when the power supply unit does not receive the AC power.

13. The power supply system of claim 12, wherein the discharge circuit includes a PNP type transistor, an emitter of the PNP type transistor is connected to a primary coil of the power supply unit, a collector of the PNP type transistor is connected to ground via a first resistor, and a base of the PNP type transistor is connected to the first DC power via a second resistor.

14. The power supply system of claim 13, wherein a diode is connected between the second resistor and the first DC power; an anode of the diode is supplied with the first DC power, and a cathode of the diode is connected to the second resistor.

15. The power supply system of claim 10, further comprising a network chipset, wherein the DC/DC converter is connected to the network chipset to supply the second DC power to the network chipset.

16. The power supply system of claim 15, wherein the network chipset is adapted to transmit a power on signal to the first chipset when the electronic device is shut down.

17. The power supply system of claim 15, wherein the network chipset is adapted to work in a semi-duplex mode to save power when the electronic device is shut down.

18. A power supply system for an electronic device, comprising:
- a power supply unit adapted to convert an AC power into a first DC power;
- a DC/DC converter connected to the power supply unit, the DC/DC converter adapted to convert the first DC power into a second DC power;
- a super I/O chipset, the DC/DC converter connected to the super I/O chipset directly to provide the second DC power to the super I/O chipset; and
- a south bridge chipset connected to the DC/DC converter via a switch connected to the super I/O chipset and controlled by the super I/O chipset, wherein the super I/O chipset is adapted to turn on the switch to have the DC/DC converter supply the second DC power to the south bridge chipset, when the electronic device is turned on, and the super I/O chipset is adapted to turn off the switch when the electronic device is shut down;
- wherein the switch is a P channel MOSFET, a grid of the P channel MOSFET is connected to a control pin of the super I/O chipset, a source of the P channel MOSFET is connected to the DC/DC adapted to receive the second DC power, and a drain of the P channel MOSFET is connected to the south bridge chipset; the control pin is adapted to output a low level control signal when the electronic device is turned on and is adapted to output a high level control signal when the electronic device is shut down.

* * * * *